United States Patent [19]

Stauffer

[11] Patent Number: 4,925,639

[45] Date of Patent: May 15, 1990

[54] REMOVAL OF NITRIC OXIDE FROM WASTE GASES AND RECOVERY AS NITRIC ACID

[76] Inventor: John E. Stauffer, 6 Pecksland Rd., Greenwich, Conn. 06831

[21] Appl. No.: 303,159

[22] Filed: Jan. 27, 1989

Related U.S. Application Data

[63] Continuation-in-part of Ser. No. 40,185, Apr. 17, 1987, Pat. No. 4,830,718, which is a continuation-in-part of Ser. No. 789,490, Oct. 21, 1985, abandoned.

[51] Int. Cl.$^5$ .................... C01B 21/00; C01B 21/38; C01B 21/40; C25B 1/22
[52] U.S. Cl. .................................. 423/235; 423/390; 423/393; 204/103
[58] Field of Search ................. 423/390, 393, 235; 204/103

[56] References Cited

FOREIGN PATENT DOCUMENTS 2078781 1/1982 United Kingdom ................ 423/390

Primary Examiner—Gregory A. Heller
Attorney, Agent, or Firm—Krass & Young

[57] ABSTRACT

A process is provided for removing nitric oxide from effluent vent or flue gas by subjecting the gas cyclically to scrubbing with a nitric acid stream and to electrolysis of the resulting nitric acid stream containing dissolved nitric oxide to oxidize the dissolved nitric oxide to nitric acid, for purposes of economy, for achieving a useful by-product, and for minimizing environmental pollution.

6 Claims, 2 Drawing Sheets

REMOVAL OF NITRIC OXIDE FROM WASTE GASES AND RECOVERY AS NITRIC ACID

REFERENCE TO A RELATED APPLICATION

This application is a continuation-in-part of my copending application Ser. No. 040,185, filed Apr. 17, 1987, now U.S. Pat. No. 4,830,718 which in turn is a continuation-in-part of my copending application Ser. No. 789,490, filed Oct. 21, 1985 now abandoned.

FIELD OF THE INVENTION

The present invention concerns a process for removing nitric oxide from a waste gas stream such as an effluent vent, flue or exhaust gas, for purposes of economy, for achieving a useful byproduct, and for minimizing environmental pollution.

DESCRIPTION OF THE PRIOR ART

Several methods have been described for the mitigation of pollution caused by the release of nitrogen oxides ($NO_x$) into the atmosphere. Along with sulfur dioxide, $NO_x$ is an environmental pollutant that is the source of acid rain. $NO_x$ is also implicated as one of the fugitive gases causing the greenhouse effect with dire consequences for the world's climate. Of the various nitrogen oxides involved in pollution, nitric oxide (NO) is the most troublesome because it is relatively insoluble in water and alkaline solutions and therefore the most difficult to remove by existing scrubbing techniques.

Methods for reducing and removing $NO_x$ emissions and nitric oxides from gas mixtures containing the same are described in the following patents: U.S. Pat. No. 4,053,555; U.S. Pat. No. 4,081,518; U.S. Pat. No. 4,341,747; U.S. Pat. No. 4,419,333; and U.S. Pat. No. 4,562,052.

U.S. Pat. No. 4,053,555 relates to a method of removing the sparingly soluble compound nitric oxide from industrial waste gases. This is done by contacting the nitric oxide with an aqueous nitrate ion containing solution so as to oxidize the NO to a soluble trivalent state and dissolve it in the water.

U.S. Pat. No. 4,081,518 relates to a method for removing nitrogen oxides from off-gases of a nitric acid plant by contacting the gases with a countercurrently flowing stream of nitric acid to absorb the nitrogen oxides, the nitric acid then being countercurrently contacted with air to liberate the nitrogen oxides for return to the reactor section of the nitric acid plant.

U.S. Pat. No. 4,341,747 relates to a method for removing nitrogen oxides from gaseous mixtures by treatment with aqueous nitric acid solution containing hydrogen peroxide whereby the oxides are converted to nitric acid.

U.S. Pat. No. 4,419,333 relates to a method for removing nitrous gases from gas mixtures by scrubbing the mixtures with nitric acid solution and treating this solution with gaseous oxygen to oxidize contained nitric oxides to nitric acid.

U.S. Pat. No. 4,562,052 relates to a process for removing nitrogen oxides present in an off gas stream by scrubbing the gas with nitric acid to form a combined $HNO_2/HNO_3$ stream and contacting the same after heating with a stripping stream to produce a concentrated nitrogen oxide stream and a regenerated nitric acid stream.

One approach to reducing $NO_x$ emissions from power plants is to adjust the combustion conditions. $NO_x$ is known to be formed by the combination of oxygen and nitrogen at high temperatures. By resorting to the use of fluidized bed furnaces, more uniform temperature control can be achieved and thereby significant reduction of $NO_x$ can be realized.

Another method of controlling $NO_x$ emissions is the injection of ammonia into the waste gas stream, which is then passed through a catalyst bed. The ammonia reacts with $NO_x$ to form harmless nitrogen and water.

The available emission control methods, however, present certain technical difficulties and economical disadvantages. One of their primary drawbacks is that only partial reductions of $NO_x$ in waste gases are possible. Because the volume of such waste gases is enormous, even with the use of existing pollution control methods, the emissions of $NO_x$ are substantial.

Another limitation of current technology is the required capital investment and high operating costs. Fluidized bed technology necessitates completely new investment in power generating equipment. The injection of reducing gases such as ammonia can be prohibitively expensive except for relatively small sources of pollution.

Therefore, it is an object of the present invention to provide a process for the removal of $NO_x$ with high efficiencies in order to allow maximum pollution control.

It is also an object to a process that can be added onto existing facilities. By retrofitting such installations, substantial investment can be avoided.

A further object is to achieve minimum operating costs thus making the technology economical to use in as wide an area of applications as possible.

Still another object is to produce a valuable product by the recovery of nitrogen values that have commercial utility.

SUMMARY OF PREFERRED EMBODIMENTS

Figure 1:
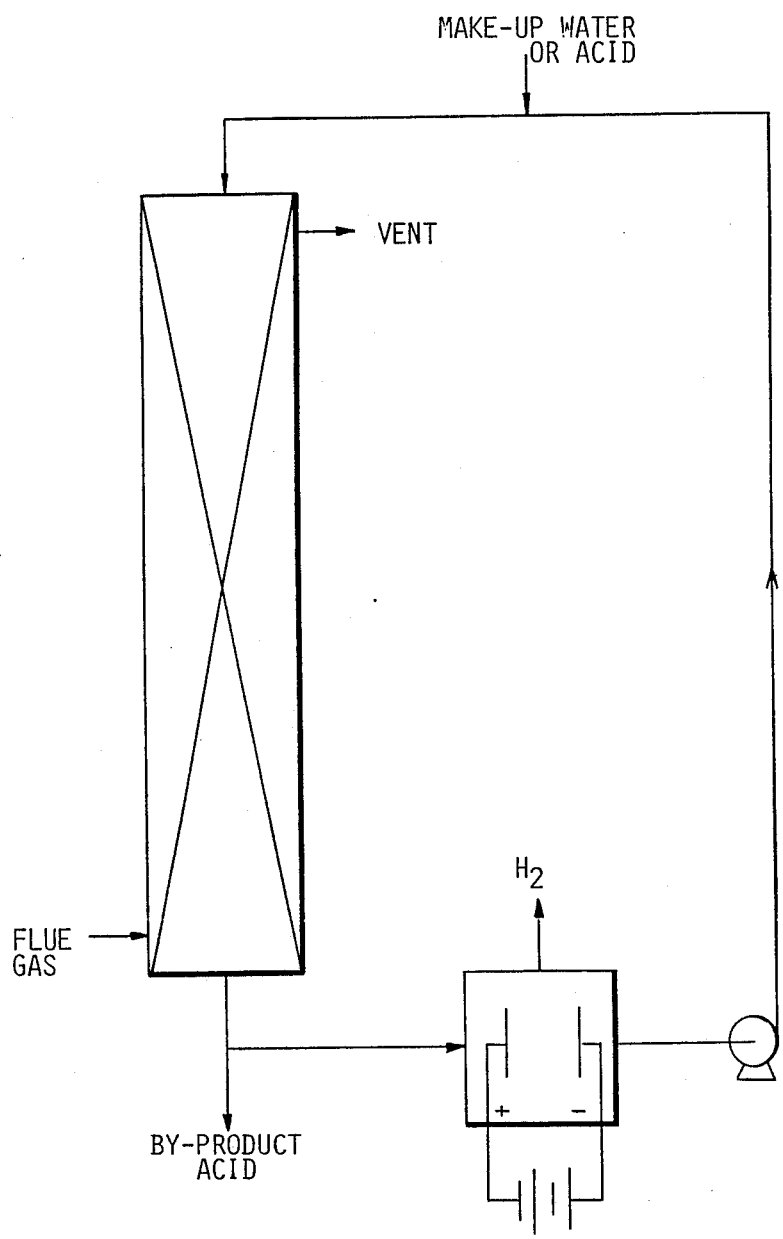
FIG. 1 is a diagrammatic representation of a preferred means for operating the present invention. A scrubbing column is illustrated in series with an electrolytic cell and a pump for circulating the absorption solution.

In one preferred embodiment the invention concerns a process for removing nitric oxide from effluent vent or flue gas, by subjecting the gas cyclically to scrubbing with an acid stream and to electrolysis. The process comprises the steps of scrubbing the gas in a confined scrubbing zone with an aqueous nitric acid stream to remove NO from the gas and subjecting the nitric acid stream containing the dissolved NO to electrolysis in an electrolytic cell to oxidize the dissolved NO to nitric acid, recycling the nitric acid stream resulting from the electrolysis step to the scrubbing zone, and maintaining the recycled nitric acid within a predetermined range of concentrations by means of make-up water or acid.

The range of concentrations of nitric acid in the acid stream is determined largely by electrical conductivities. An acid solution containing 6.2 weight percent nitric acid has a conductivity of 3123 in mho/cm$\times 10^4$ at 18° C. The corresponding value at 62 weight percent is 4964. Between the concentrations of about 20 and 40 weight percent the conductivities exceed 6500. The advantages of operating above a certain minimum concentration are not only the lower electrical resistance of the scrubbing solution but also the reduced cost of concentrating the product acid.

The scrubbing zone conveniently is the chamber contained within an absorber or scrubbing column of conventional design or modified design for passage of a stream of effluent gas therethrough. Preferably, the scrubbing column contains packing material that provides gas-liquid contact surface for the gas stream and the aqueous acid stream. The design of the packing material is critical in order to minimize channeling and thereby achieve greater scrubbing efficiency.

In a preferred embodiment of the process, the packing material is electrically conductive and serves as both a gas-liquid contact surface for scrubbing and as the electrochemically active surface of the electrolytic cell. From time to time, as desired, the byproduct nitric acid is withdrawn in desired quantity from the acid stream. This is done, for example, while adding or making-up with water to lower the acid concentration to a predetermined level. In a preferred embodiment, the dissolved nitric oxide in the acid stream is kept at a minimum concentration by employing an anode with increased area, preferably by employing an anode comprising electrically conductive packing in the scrubbing column.

DETAILED DESCRIPTION OF THE PREFERRED EMBODIMENTS

Electrolysis, according to the invention, is an effective and efficient method of converting dissolved NO to nitric acid. The overall reactions which occur can be represented by the following equations: At the anode:

$$NO(g) + 2H_2O \rightarrow NO_3^- + 4H^+ + 3e^- \quad E^\circ = -0.96 \text{ v.} \quad (1)$$

and at the cathode:

$$2H^+ + 2e^- \rightarrow H_2 \quad E^\circ = 0 \text{ v.} \quad (2)$$

The actual reaction mechanisms are probably more complex than indicated by the above equations. The solubility of NO in cold water is quite low, being given as 7.34 cc per 100 gm. of water at 0° C. In dilute nitric acid, however, NO quite likely dissolves to form nitrous acid according to the following equation:

$$2NO(g) + H_2O + HNO_3 \rightarrow 3HNO_2 \quad (3)$$

The nitrous acid so formed is a weak acid ($K_{diss} = 4.5 \times 10^{-4}$), but some of it dissociates to form nitrite ions which can be oxidized at the anode. Thus, at the anode the following reaction occurs:

$$HNO_2 + H_2O \rightarrow NO_3^- + 3H^+ + 2e^- \quad E^\circ = -0.94 \text{ v.} \quad (4)$$

The net reaction obtained by combining equations 3 and 4 is the same as equation 1.

The above theoretical electrode potentials indicate only the relative power needs. In practice, the theoretical voltages cannot be obtained because of electrode polarization. A hydrogen overvoltage on the cathode of about 0.3 volts is required for a smooth platinum electrode at a current density of 100 milliamps per square centimeter. Thus, a minimum potential across the electrodes of about 1.2 volts is necessary.

The capacity of a pollution control unit to strip NO from waste gases by the present invention is readily adjustable so that upsets can be handled. For example, any surge in the volume of the vent gas or increase in NO concentration above design conditions can be adequately met. This result is accomplished by raising the applied voltage thus causing an increase in electrode current density. To cope with emergencies or irregularities, the potential across the electrodes can be raised as high as about 1.7 volts, which is the potential where nascent oxygen begins to form. The applied cell voltage in all cases is equal to the potential across the electrodes plus the potential through the electrolyte. The later value is dependent on the acid conductivity and the cell geometry.

In many instances where $NO_x$ occurs in waste gases, sulfur dioxide is also present. Such is the case with flue gases from power plants that burn coal. When these gases containing both NO and sulfur dioxide are treated by processes of the present invention both nitric acid and sulfuric acid will be formed. Thus, the scrubbing acid will consist of a mixture of nitric and sulfuric acids.

Alternatively, waste gases containing both NO and sulfur dioxide can be treated sequentially in two separate scrubbing columns. In the first tower the electrode potential is held below 1.2 volts so as to remove only sulfur dioxide. In the second unit the electrode potential is raised above 1.2 volts so as to recover nitric acid.

One preferred embodiment of the invention is shown in FIG. 1. Vent or flue gases are contacted at ambient temperature or higher in an absorber or scrubbing column with a downstream of nitric acid. This acid stream strips the NO and any other nitrogen oxides ($NO_x$) present in the gas stream. The acid containing the absorbed NO is passed to an electrolytic cell which converts the NO as nitrous acid to more nitric acid. Hydrogen is vented from the cell. The electrodes must stand up to the corrosive conditions and therefore are fabricated from suitably inert electrode materials such as graphite, platinum, iridium and rhodium.

By operating the process with dilute nitric acid the electrical resistance is minimized. Acid between 20 percent and 40 percent by weight has the greatest conductance. In order to maintain this concentration, make-up water or concentrated acid must be added depending on the moisture content of the flue gas. Byproduct acid is withdrawn from the system as it is produced.

A preferred modification of the process provides an improvement in its efficiency. In order to remove a maximum amount of NO from the gas stream, the dissolved NO in the acid must be kept at a minimum concentration. This result can be achieved by increasing the area of the anode. A further advantage of increasing the anode area is that the current density can thereby be reduced and thus the applied voltage.

Figure 2:
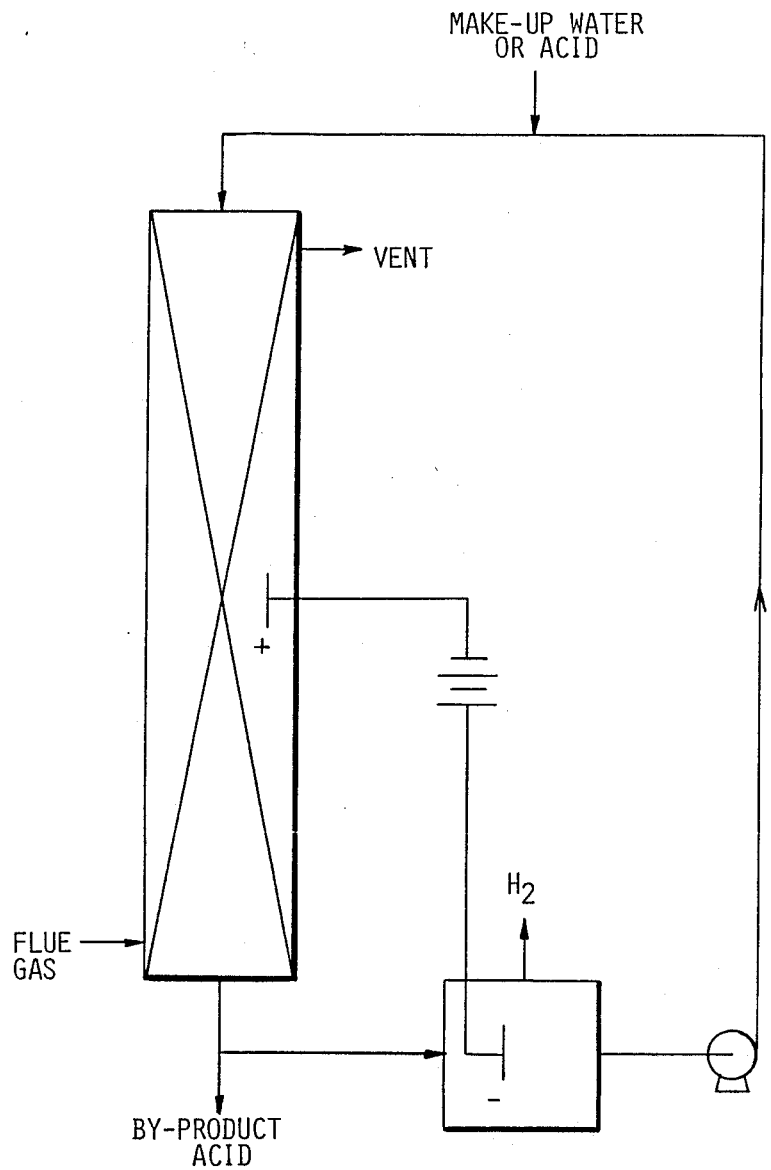
FIG. 2 shows a preferred modification whereby the packing in the scrubbing column serves the dual purpose of providing contact surface between the flue gas and the scrubbing solution and of functioning as the anode of the electrolytic cell.

One preferred way of enlarging the anode area is by using the packing in the scrubbing column for the dual purposes of providing gas-liquid contact surface and also serving as the anode. This design has the further advantage of improving the transport of nitrite ions through the diffusion layer. In this application the packing must be made of an electrically conductive material that is also corrosion resistant to the acid. Such materials as graphite, graphite treated with a noble metal, or platinum-plated base metal are recommended. FIG. 2 shows the layout of the process in which the column packing functions as the anode.

An important advantage of the present invention is that a valuable byproduct is produced. The nitric acid so produced may be used in fertilizer products or for industrial purposes. As required it can be concentrated by methods that are well known in the art. The value of the acid produced can be credited to the pollution control operations thereby enhancing the economics of the process.

The potential applications of the present invention are numerous, but two broad uses stand out as being particularly significant. The process can be applied to the cleaning of flue gases from power plants that burn fossil fuels. And secondly, the process can be used to treat the plume from nitric acid plants. In both applications the process of the present invention is suitable for retrofitting existing installations in order to bring them into compliance with effluent standards.

The embodiments of the invention in which exclusive property or privilege is claimed are defined as follow:

1. A process for the mitigation and control of air pollution caused by the emission of nitric oxide in effluent vent, flue or exhaust gas, said process comprising the removal of nitric oxide from such effluent vent, flue or exhaust gas by means of the steps of:

scrubbing the gas in a column comprising means both for scrubbing and electrolyzing, with an acid stream comprising aqueous nitric acid to solubilize and remove nitric oxide from the gas, said means comprising packing material that is electrically conductive, while, simultaneously with said scrubbing, subjecting the nitric acid stream containing the thus solubilized nitric oxide to electrolysis in the column such that the solubilized nitric oxide is oxidized to nitric acid, said electrolysis being conducted by applying a potential across two electrodes one of them being an anode in the column which comprises the electrically conductive packing material which serves both as the anode and as a gas-liquid contact surface for scrubbing, removing from the column the nitric acid stream resulting from the electrolysis step and recycling the nitric acid stream to the column, while maintaining the concentration of the nitric acid in the recycled stream by means of make-up water or acid.

2. A process according to claim 1 where the potential applied across the electrodes is between about 1.2 volts and about 1.7 volts.

3. A process according to claim 1 where the concentration of the nitric acid stream is maintained between about 6.2 weight percent and about 62 weight percent.

4. A process according to claim 1 where the concentration of the nitric acid stream is maintained between about 20 weight percent and 40 weight percent.

5. A process according to claim 1, comprising the step of withdrawing byproduct nitric acid from the acid stream.

6. A process according to claim 1, where the electrolysis comprises the reaction $$NO + 2H_2O \rightarrow NO_3^- + 4H^+ + 3e^-.$$

* * * * *

UNITED STATES PATENT AND TRADEMARK OFFICE
CERTIFICATE OF CORRECTION

PATENT NO. : 4,925,639
DATED : May 15, 1990
INVENTOR(S) : John E. Stauffer

It is certified that error appears in the above-identified patent and that said Letters Patent is hereby corrected as shown below:

Column 1, line 34, "4,081,518" should be --4,081,518--.

Signed and Sealed this

Ninth Day of July, 1991

Attest:

HARRY F. MANBECK. JR.

*Attesting Officer*      Commissioner of Patents and Trademarks